July 31, 1962  J. T. GRESHAM  3,047,445
CELLULOSIC WIPING MATERIAL
Filed June 2, 1958
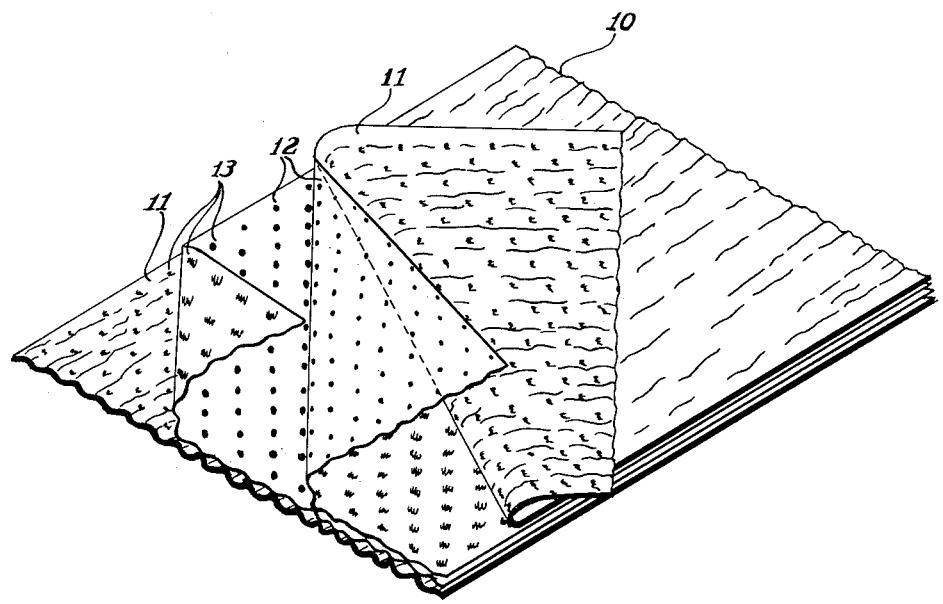

United States Patent Office 3,047,445
Patented July 31, 1962

3,047,445
CELLULOSIC WIPING MATERIAL
James T. Gresham, Appleton, Wis., assignor to Kimberly-Clark Corporation, Neenah, Wis., a corporation of Delaware
Filed June 2, 1958, Ser. No. 739,281
5 Claims. (Cl. 154—46)

The present invention relates to the manufacture of cellulosic products but more particularly is concerned with multi-ply cellulose paper wipers.

Wipers or industrial cleaning towels are widely used for the removal of dirt, grease, grime, etc., from parts, the wiping of dust from surfaces, absorption or mopping up of aqueous fluids, organic fluids, paints, oils, greases, etc., and the cleaning and polishing of various items. Wipers are used for cleaning a wide range of objects from rough surfaced objects to objects having delicate, critical surfaces, such as precision bearings, optical equipment, etc.

Because of the many uses for wipers there are a considerable number of attributes which a wiper should possess. In the first place, the wiper should be soft and have a good hand and feel and have a high degree of conformability since in order to be effective it should readily adapt itself to any surfaces with which it is brought in contact. It must, however, have a certain toughness, that is a resistance to tearing and to abrasion, since wipers are often used to clean rough surfaces or articles having sharp points and edges. The wiper should have a good degree of water resistance and of solvent resistance so that it will not disintegrate or become excessively weakened by contact with water or with the various organic solvents, oils, greases, etc. The absorbency and the wiping efficiency of the solvent must be adequate since wipers are often used to clean delicate surfaces. The wiper must be highly non-abrasive and non-linting. The wiper should also be made of a clean material and a good degree of uniformity between wipers is desirable. Finally, the wiper should be inexpensive.

Now, while all of the foregoing characteristics are desirable in general purpose wipers it will be apparent that it may be difficult to obtain some of these characteristics to a satisfactory degree without a corresponding loss in other characteristics. For example, the textile cloths which were formerly almost entirely used in this field, while they had good strength, absorbency, wiping efficiency and conformability were seldom uniform and even the minimum quality wiping cloths were quite expensive and the cloths were usually laundered to make the cost tolerable. In addition, the cleanliness, linting and abrasiveness were difficult to control.

For many wiping uses in recent years creped cellulose wadding towels have been employed. These towels are usually made up of one or two plies of a creped cellulose wadding tissue which has been impregnated with a wet strength resin to make it resistant to water and solvents. These towels are so inexpensive that they can be economically used and then disposed of after very short periods of use. The cellulose towels have excellent uniformity, cleanliness, and non-linting and non-abrasive characteristics. Their wiping efficiency is good and towels having good strength can be made. It is, however, difficult to achieve high strength and abrasion resistance in a towel and at the same time achieve high absorbency, hand, feel and conformability since strength is dependent on having adequate fiber to fiber bonds and absorbency, hand, feel, softness and conformability are obtained by having a bulky paper in which the fiber to fiber bonds are at a minimum. In addition, the resins which are added to paper to give them wet strength are essential to the strength characteristics of a wiper, but do detract to a certain extent from the softness and absorbency characteristics.

It is an object of the present invention to provide a wiper having improved softness, conformability, and absorption without any sacrifice of strength or abrasion resistance.

There are other objects and advantages that will become apparent as the description proceeds.

A preferred embodiment of the present invention is illustrated in the accompanying drawing consisting of one figure.

It has been found in accordance with the present invention that a wiper having the desired characteristics of softness, conformability and absorbency, strength and tear resistance can be formed by laminating together with discrete spaced adhesive spots a sandwich, the inner layers of a bulky, highly absorbent, creped paper wadding and the outer layers of a strong, wet-strength creped paper.

In a preferred embodiment of the wiper 10 the two inner plies of the wiper 12 are formed of a creped tissue paper. This creped tissue paper may be made from any conventional paper furnish used in the manufacture of tissue papers. It is desired to obtain a creped paper which has good bulk, softness and absorbency so that the furnish should be substantially free of wet-strength resin and other additives that would detract from these characteristics. The paper should be formed on a paper machine in such a manner as to produce an open formation. This is desirable since it permits better penetration of the adhesive through the inner plies of the wiper. A preferred form of inner ply has six to eight voids per square inch of a size up to one eighth inch in diameter. The softness and bulk are obtained in the inner plies by creping the paper. Paper having a crepe ratio between about 1.25 and 2.25 is preferred. The term "crepe ratio" is used in the present specification and claims to mean the ratio of the length of the paper before creping to the length after creping. Moderate weight creped papers of the order of 10 to 35 grams per square meter are suitable for use in the inner layers and papers having a weight of between about 15 and 19 grams per square meter are preferred.

The outer plies 11 of the wiper are also of a creped paper but are of heavier weight, wet-strength paper. The outer layers of the wiper are relied upon to furnish the strength, abrasion resistance, and tear resistance of the wiper so that these papers should be made of paper making fibers which have substantial strength.

Papers having dry tensile strengths measured in accordance with TAPPI (Technical Association of Pulp and Paper Industry) Standard T 404 of between about 0.1 and 0.36, and preferably betwen about 0.22–0.30 kilogram per 15 millimeter strip, measured in the cross direction are suitable. Thus the pulp employed in the furnish may be kraft, sulfite or other similar chemical wood pulps. Groundwood and other paper making fiber pulps may also be included as long as suitable strength of the finished paper is maintained. The pulp may be either bleached or unbleached.

The outer plies are also creped in order to obtain softness and comformability of the sheet without any substantial loss of strength. The creping of the outer plies, however, may be substantially less than that of the inner plies, for example the outer plies may have a crepe ratio of between about 1.05 and 1.75.

The outer plies are of a wet-strength paper having a wet-strength at least about 20 percent, and preferably about 40 percent as great as the dry strength. Any conventional method of imparting wet strength to paper may be employed such as those described in TAPPI Monograph No. 13 "Wet Strength in Paper and Paperboard." The methods usually employed comprise incorporating a melamine-formaldehyde, urea-formaldehyde, or similar resins in the pulp furnish. It is desirable to impregnate the wet-strength paper with a conventional wetting agent, for example "Triton X 100," by spraying a fine amount on the paper. This tends to prevent a loss of water absorbency which sometimes occurs with wet-strength papers as they age.

The method of laminating the plies of the wiper together are of considerable importance. The plies must be securely attached to each other so that there will be no tendency to delaminate in use. On the other hand, it is essential that the plies are not so rigidly attached to each other that there is any substantial loss of softness, hand or conformability. In addition, it is important that the non-abrasiveness of the surface of the wiper be maintained; therefore it is essential that no adhesive spots be formed on the surface of the wiper.

It has been found in accordance with the present invention that the inner and outer plies of the wiper may be laminated together to form a complete wiper by depositing a predetermined amount of a suitable adhesive on the inner surface of one of the inner plies in discrete spots at spaced intervals from each other and then pressing all of the plies together. The amount of adhesive deposited in each spot is sufficient so that a portion of the adhesive deposited will penetrate through each of the inner plies and adhere to the inner surface of the outer lamination but not penetrate through the outer plies. Thus the inner and outer plies are laminated together into an adherent wiper with substantially no adhesive penetration to the outer surface of the wiper. The adhesive spots are so spaced that just sufficient adhesive is used to insure good adherence of the plies. In this manner good delamination resistance is secured without a loss of softness or conformability that would result from uniform edge to edge bonding of the plies. The total amount of adhesive employed will depend upon the particular adhesive used, the penetrability of the inner plies of the wiper, the amount of adhesive deposited in each spot and the number of adhesive spots per unit area. As previously pointed out the amount of adhesive deposited in any one spot should be the amount sufficient to penetrate through the inner laminations and bond the outer laminations to the inner laminations without penetrating through the outer lamination. The number of spots per unit area should be just sufficient to give adequate delamination resistance. The spots may be random spaced, but are preferably in a uniform pattern.

The adhesive employed to laminate the plies together should be one which has good adherance to cellulose, good aqueous and organic solvent resistance, and one which is of the non-rigid film forming type in order to avoid any tendency towards abrasiveness. While many suitable adhesives having these characteristics such as synthetic latices, oil soluble adhesives, hot melt adhesive, may be used, one which has been found to be particularly suitable is a casein-stabilized pre-plasticized polyvinyl acetate emulsion adhesive.

One suitable method of depositing a predetermined amount of adhesive on an inner ply of the wiper in particular spaced and measured droplets is by intaglio printing. In this method one of the inner plies of the wiper is passed in contact with a roll having regularly spaced depressions or cells in its surface from which adhesive droplets are deposited on the inner ply. The other plies may then be brought in contact with the ply having the deposited adhesive droplets and pressure applied, for example by passing the composite assembly of plies through the nips of a pair of rolls, to complete the gluing operation. Other methods of depositing the adhesive on an inner ply and laminating the plies of the wiper together may, however, be employed.

The wiper thus formed is well adapted for substantially all wiper uses. The outer layers of the wrapper are water resistant and solvent resistant and have strength, abrasion resistance, and tear resistance which compares favorably with cloth wipers. The wipers are non-linting and non-abrasive and since they are formed by conventional paper making methods are uniform and clean. The inner layers which greatly add to the bulk of the wiper, increase the absorbency, and make for a much softer, more conformable wiper with excellent hand and feel. The method of laminating the plies together with precisely determined amounts of adhesive applied in spaced spots insures wipers which are not only resistant to delamination, but also soft and conformable because of the relative amount of motion between the plies permitted by the spaced adhesive dots. In addition the wiper is relatively inexpensive and may be discarded after comparatively short periods of use.

Now that the present invention has been generally described it may be further illustrated by the following specific example.

*Example*

The wiper was made up of four sheets or plies of creped tissue paper. The two inner plies were identical as were the two outer plies. The inner plies were a typical creped tissue paper having a crepe ratio of 1.6 and a weight of 16.1 grams per square meter. The tensile strength of the inner ply in the machine direction was .12 kilogram per 15 mm. strip and in the cross direction 0.032 kilogram per 15 mm. strip. The absorbency rate of the tissue paper used in the inner plies was six seconds; and the absorbent capacity was sixteen to eighteen times. The absorbency rate and absorbent capacity were determined in accordance with Military Specification MIL–T–15907B. In the absorbency rate test a forty ply pad of the paper 2½ inches by 2½ inches square is dropped into a water bath maintained at a temperature of 30° C., and the length of time required to completely wet the pad is measured. In the absorbent capacity test a forty ply pad 4 inches by 4 inches square is weighed and then dipped into a water bath at 30° C., and after the pad comes to equilibrium it is removed from the bath and allowed to drain for exactly thirty seconds. The pad is then weighed to determine the amount of water absorbed, and the capacity measured by dividing the weight of water absorbed by the weight of the dry pad.

The outer plies of the wiper were made of a creped tissue paper having a weight after creping of 28.3 grams per square meter and a crepe ratio of 1.6. The outer plies were made of a wet-strength paper which had been prepared with a melamine-formaldehyde resin. The tensile strength in the dry state was .54 gram per 15 mm. strip in the machine direction and .36 kilogram per 15 mm. strip in the cross direction. The tensile strength of the paper in the wet condition was .32 kilogram per 15 mm. strip in the machine direction and .17 kilogram per 15 mm. strip in the cross direction. The absorbency rate measured as with the inner plies was twelve seconds and the absorbent capacity was eight times.

The plies were laminated together with a commercial casein-stabilized pre-plasticized polyvinyl acetate emulsion adhesive, Arabol C–1312 which was applied to the paper with an intaglio printing process. The intaglio adhesive applicator roll had 540 depressions or cells per square foot of surface arranged in a diamond pattern. Each cell was 0.062 inch in diameter at the surface of the roll and was in the shape of a right cone with a 90° apex angle. One outer ply and one inner ply were passed in contact with the intaglio adhesive applicator roll with the inner ply adjacent to the roll so that approximately 0.7 pound of adhesive solids were deposited per thousand square feet of paper. The inner and outer layers after passing over the intaglio roll were then brought in contact with a second inner and outer layer with the two inner layers in face to face relationship and the four layers then passed through a press roll to complete the laminating operation.

While there have been described certain embodiments in this invention it is to be understood that it is capable of many modifications. For example, the papers employed may be either white or colored. The completed wiper may be embossed or be given other texturized finishes. Various additives which do not affect the absorbency or the strength may be incorporated in the paper, for example the papers may be treated to make them fire resistant. Changes therefore may be made without departing from the spirit and scope of the invention as described in the appended claims in which the intention is to claim all novelty inherent in the invention as broadly as possible, in view of the prior art.

What is claimed is:

1. A wiping material comprising a pair of outer plies of relatively strong creped cellulose wadding having substantial wet strength characteristics and a plurality of plies of relatively weak creped cellulose wadding of high liquid absorbency characteristics disposed intermediate said outer plies, said inner and outer plies being maintained as a loose laminated assembly by spaced discrete adhesive bonds extending through the inner plies and partially through contiguous contacting areas of the outer plies, whereby to maintain the plies in unitary assembly with the outer surfaces of said outer plies devoid of said bonding material.

2. A loosely laminated wiper material comprising a pair of outer plies of relatively strong creped high wet strength paper having positioned intermediate thereof contiguously associated inner plies of soft, bulky, relatively weak liquid absorbent creped tissue, adhesive bonds maintaining said plies in unitary assembly, said bonds consisting of adhesive material deposited throughout the surface of said inner plies in discrete spot-like areas and extending through the inner plies and into bonded engagement with contiguous areas of the inner surface of the outer plies, said spot-like adhesive areas terminating short of the outer surfaces of said outer plies.

3. A laminated wiper comprising two inner plies of an open-formation tissue paper having a weight of between about 10–35 grams per square meter, and a crepe ratio of between about 1.25–2.25, two outer plies superposed upon said inner plies, said outer plies of a creped wet strength paper having a dry tensile strength in the cross direction of 0.1–0.36 kilogram per 15 mm. strip, wet-strength at least 20 percent of the dry strength and a crepe ratio of 1.05–1.75, said wipers laminated together by spaced adhesive spots of a water-resistant, solvent-resistant, non-rigid film forming adhesive, said adhesive spots penetrating the inner plies and adhering to the inner surface of the outer plies, but not penetrating to the outer surface of said outer plies.

4. A laminated wiper comprising two inner plies of an open-formation tissue paper having a weight of between about 15–19 grams per square meter, and a crepe ratio of between 1.25–2.25, two outer plies superposed upon said inner plies, said outer plies of a creped, wet-strength paper having a dry tensile strength in the cross direction of 0.24–0.30 kilogram per 15 mm. strip, a wet tensile strength at least 40 percent that of the dry tensile strength and a crepe ratio of about 1.6, said inner and outer plies laminated together by spaced spots of a casein-stabilized, pre-plasticized, polyvinyl acetate emulsion adhesive, said adhesive spots penetrating the inner plies and adhering to the inner surface of the outer plies, but not penetrating to the outer surface of said outer plies.

5. The method of forming a laminated wiper material consisting of the steps of forming an assembly comprising a plurality of light weight sheets of creped wadding in the form of a stack, one of the sheets near the center of the stack having spot-like areas of non-set adhesive deposited thereon in patterned configuration, positioning a relatively heavy outer sheet of creped wadding treated for wet strength in contiguous engagement with the light weight sheet at each end of the stack, and thereafter pressing together the assembly thus formed sufficiently to cause migration of the adhesive of each spot-like area completely through all of the light weight sheets but only partially through each of the outer heavy weight sheets, whereby to form a multiple sheet wiper material the sheets of which are interjoined, the exposed surfaces of the outer sheets being devoid of adhesive.

References Cited in the file of this patent

UNITED STATES PATENTS

| 1,992,215 | Kellett | Feb. 26, 1935 |
| 2,014,460 | Alm | Sept. 17, 1935 |
| 2,170,655 | Fourness | Aug. 22, 1939 |
| 2,406,416 | Turner | Aug. 27, 1946 |
| 2,712,174 | Hubbell | July 5, 1955 |
| 2,809,910 | Deddo | Oct. 15, 1957 |
| 2,833,283 | Spahr et al. | May 6, 1958 |
| 2,890,700 | Lonberg-Holm | June 16, 1959 |
| 2,896,626 | Voigtman | July 28, 1959 |
| 2,897,108 | Harwood | July 28, 1959 |
| 2,902,395 | Hirschy et al. | Sept. 1, 1959 |

FOREIGN PATENTS

| 489,356 | Great Britain | Oct. 20, 1936 |
| 463,256 | Great Britain | Mar. 25, 1937 |